Nov. 3, 1964     E. R. GILL, JR     3,155,764
FLEXIBLE WEATHERPROOF REFLEX LIGHT REFLECTOR
SHEET AND SIGN MADE THEREOF
Filed March 24, 1960

INVENTOR
Edwin R. Gill, Jr.
BY Karl W. Flocks
ATTORNEY

United States Patent Office 3,155,764
Patented Nov. 3, 1964

3,155,764
FLEXIBLE WEATHERPROOF REFLEX LIGHT REFLECTOR SHEET AND SIGN MADE THEREOF
Edwin R. Gill, Jr., Millerton, N.Y., assignor to
Karl W. Flocks, Washington, D.C.
Filed Mar. 24, 1960, Ser. No. 17,342
9 Claims. (Cl. 88—82)

This invention relates to reflex light-reflecting sheet material adapted for use in making outdoor signs, markers, guides and the like, and more particularly to a relatively thin pliable weatherproof reflex light reflector sheet.

A reflex light reflector sheet is one which acts on an incident beam or ray of light to refract and reflect in such a manner that most of the light is selectively directed or returned back toward the source in a cone having a small angle, even though the incident light strikes at an angle.

Such reflection is to be distinguished from that produced by a plane reflector, such as a flat metallic surface, where an incident ray is reflected as a ray at an angle equal to the angle of incidence but on the other side of a line drawn normal to the surface at the point of incidence. It is also to be distinguished from the type of reflection produced by a diffusing surface where an incident ray is reflected in all directions with approximately equal intensity distribution over a wide angle. In the first case, an observer must be located substantially on the line of reflection in order to see the reflected light. In the second case, the diffusion of light over a wide angle greatly reduces the intensity of that directed toward the observer. Put in the present case, where reflex reflection is obtained, the observer may be at a small angle from the line of incident light, and the light may strike the reflector at an angle, and yet he will be within the cone of reflected light which is of high intensity. Thus, the driver of an automobile whose headlights illuminate the reflex light reflecting sheet, even though at an angle, will be able to see the reflected light at a great distance, and such a sign will be noticed and readable long before an ordinary sign would be visible.

This general optical principle has previously been employed in outdoor signs and markers; however, the present invention embodies this principle in a novel article of manufacture.

Previously proposed reflex-reflective sheet material utilizes glass beads bonded in a binder material. Difficulty has been experienced with such sheet material of the flexible type in preventing the glass beads from falling off of the sheet.

An object of the present invention is to provide a preformed continuous reflex reflector sheet material, which may be conveniently manufactured in continuous fashion and supplied in rolls, and which the user may easily cut into desired shapes and adhesively unite to any desired base or backing. This permits the user to make his own signs or to convert ordinary signs into the improved reflexive type.

A further object of the present invention is to provide reflex reflector sheet material which is weatherproof.

A still further object of the present invention is to provide reflex reflector sheet material which is provided with an integral adhesive coating on the back so that it may be united to the desired base without the need of applying an adhesive.

Another object of the present invention is to provide signs, markers, reflectors and the like made from this reflex reflector sheet material.

Other objects and the advantages of this invention will be apparent upon consideration of the following detailed description thereof in conjunction with the annexed drawing wherein.

Figure 1:
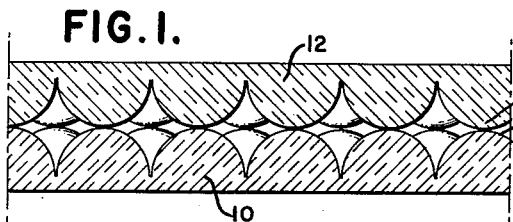
FIG. 1 is a diagram illustrating in magnified form a section of a reflex reflector sheet material in accordance with the invention.
Figure 3:
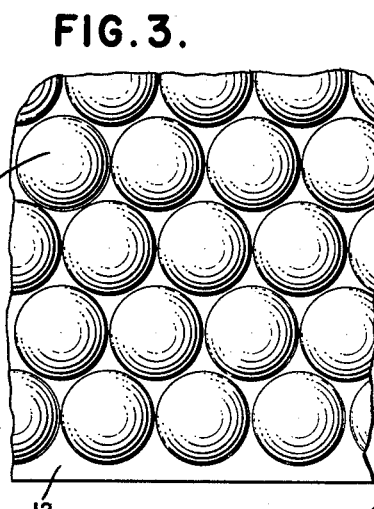
FIG. 3 is a fragmentary enlarged plan view of the underside of the upper face surface portion of the sheet.

Referring to the drawings, an illustrative embodiment of a flexible reflex reflector sheet material is shown in FIG. 1 formed of a lower lamina 10 and an upper or face lamina 12. Each lamina is embossed on its inner face and is provided with a smooth flat outer face. The embossed upper surface of lower lamina 10 is formed with upwardly projecting knobs or bosses 14 which are shown to be semispherical. The embossed lower surface of upper lamina 12 is formed with downwardly projecting knobs or bosses 16 which are also shown to be semispherical. An intermediate transparent plastic material 18 between the two laminae acts to cement the upper and lower lamina together and also has an essential function in the optical system. The bosses 14 and 16 are preferably arranged in a honeycomb pattern as shown in FIG. 3, and the bosses 14 and 16 are maintained in alignment. Adjacent bosses on the two laminae may be in engagement with one another or slightly separated.

By having the bosses in contact, certain advantages accrue, such as better physical strength and support. Also, in manufacturing, this feature insures a self-regulating thickness to the sheet since in assembling the two laminae together the bosses act in the manner of limiting stops. However, good reflex reflecting sheets are obtained where the faces of the bosses are separated up to .4 times the radius of the bosses.

The laminae 10 and 12 may be identical in configuration and may be made of a plastic material. The index of refraction should be relatively high as compared to the index of the adhesive layer 18. The intermediate material 18 between the laminae 10 and 12 has a relatively low index of refraction.

Although the index of refraction of the laminae 10 and 12 and the adhesive layer 18 is not critical, it is imperative that the index of refraction of the laminae 10 and 12 be considerably higher than the index of the adhesive layer 18. As a guide to the selection of materials, the ratio of the lower index of refraction of layer 18 to the higher index of refraction of layers 10 and 12 should be approximately .7–.9. Most commercial adhesives are believed to have an index of refraction of about 1.33 to 1.47. Examples are cellulose acetate, epoxy resins and the like. The laminae 10, 12 should thus have an index of at least 1.5 when used with an adhesive near the lower range of the index. Polystyrene is an example of a suitable material for these laminae.

In use, a reflective layer may be adhesively attached to the bottom face of the sheet, or the sheet may be applied directly onto a base which acts as the reflective surface.

Figure 2:
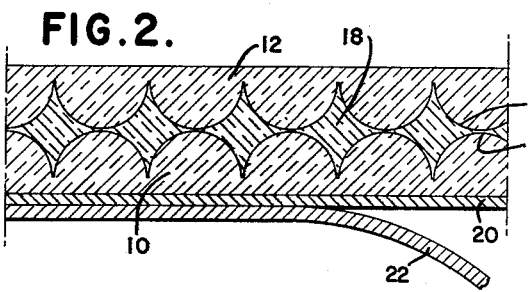
FIG. 2 is a similar view showing the material with an integral adhesive coating on the back.

As shown in FIG. 2, a film of sensitive cement 20 is applied to the lower surface of the sheet, and a protective peelable film 22. In use, the film 22 is peeled off and the sheet is applied directly onto a reflective base, the cement film 20 acting as an adhesive to hold the sheet thereon.

It is seen that the center of curvature of the bosses 14 on the lower lamina 10 is spaced a distance from the lower flat surface of the sheet. This distance is such that the reflecting surface to which the lower surface is attached is located within the region of condensation of the lenses. In dealing with such spherical bosses there is no true focus point but only a region of condensation. Within this region there is a point of least confusion, and if the reflective material is brought to or near this point, then the effective visible distance is at a maximum. This distance is not important in the upper lamina 12; however, for simplicity in manufacture and in the interest of economy, the spacing of the upper lamina can be the same as that of the lower lamina. The spacing required for the lower lamina governs, as it is critical, while the spacing of the upper lamina is not.

Figure 4:
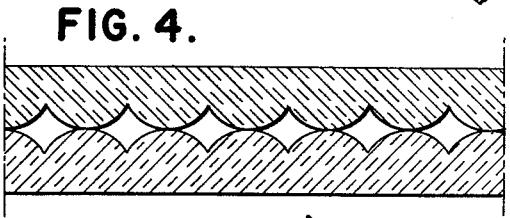
FIG. 4 is a view similar to FIG. 1 showing the bosses as being spherical calottes instead of hemispheres.

The exact shape of the bosses 16 is not critical. FIG. 1 shows the bosses to be full hemispheres, but they can be reduced to spherical calottes as shown in FIG. 4. They may be of spheroidal curvature or even take other forms such as the parabolic or hyperbolic, and the pairs need not necessarily be alike. The size of the bosses has no critical significance from the optical standpoint so that they may be made as small as manufacturing considerations permit. The larger the number of lenses per unit area, the better the reflex reflection obtained.

Figure 8:
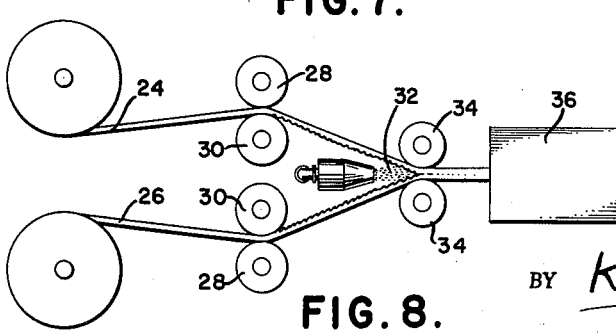
FIG. 8 is a diagrammatic showing of a process for the formation of the reflex reflecting sheet material.

Reflex light reflecting sheet material in accordance with this invention can be produced in a continuous web by the process illustrated in FIG. 8. An upper web 24 and a lower web 26 of suitable plastic material are each passed through a pair of rollers 28, 30. The roller 28 can be a smooth pressure roller and the roller 30 an embossing roller adapted to emboss the inner surfaces of the webs with the desired hemispherical bosses or calottes as illustrated. The embossed webs are then brought together preceeded by being sprayed at 32 with a coating of the intermediate plastic material 18. The webs then are pressed together between the rollers 34, followed by curing in the oven 36 and the final product can then be rolled up into a roll 38.

When it is desired to space the faces of the bosses, a simple process of manufacture has been devised which utilizes a spacing sheet of the desired thickness which is inserted between the laminae 10, 12 and against which the faces of the bosses are in contact. The adhesive material is applied on each side of the spacing sheet to fill the spaces between the bosses. The spacing sheet is transparent and of a lower index of refraction similar to that of the adhesive material.

In use the sheet material can be cut into the desired shape and readily applied onto a painted reflective surface, as a sign, to render it reflex light reflecting.

Figure 7:
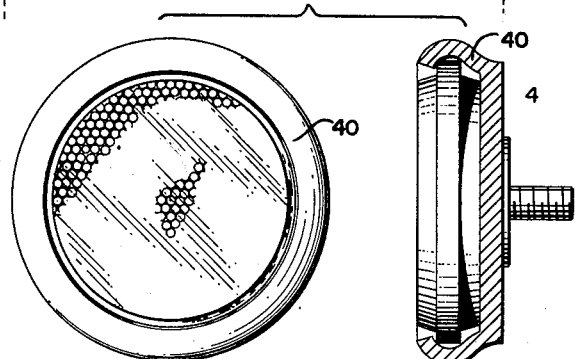
FIG. 7 shows in plan and in section an application of the sheet material as a vehicle reflector.

There are many uses for this material, and a particular article of commerce utilizing this material is shown in FIG. 7. The sheet material is mounted on a suitable frame 40 which may then be used as a truck or vehicle reflector. This construction is particularly useful since the sandwich structure utilized is less liable to breakage than those proposed by the prior art.

Figure 5:
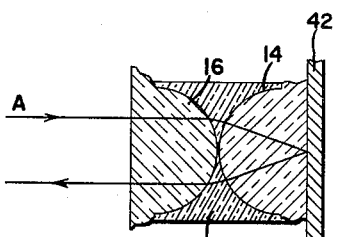
FIG. 5 is an enlarged view of a single pair of bosses showing the reflex reflection at normal incidence.
Figure 6:
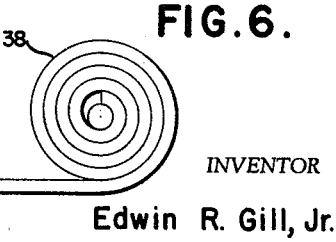
FIG. 6 is a view similar to FIG. 5 showing the reflex reflection at an angle of incidence other than normal.

The refractions of the light which produce the reflex reflection are shown in FIGS. 5 and 6. FIG. 5 shows the refractions from a normal ray of light A entering one of the bosses 16, passing through the intermediate material 18, boss 14 and being reflected back from the reflecting surface 42 through the sheet. FIG. 6 shows the refractions from an angular ray of light B entering the sheet. These refractions are the result of a difference in the index of refraction between the bosses 14, 16 on the one hand, and the intermediate material 18 on the other, the bosses having a relatively high index, while that of the intermediate material is relatively low. The angles on opposite sides are complementary and thus the light returned is reflexly reflected.

The principles disclosed herein may be employed with other than pliable sheets, and this is deemed to be within the scope of the invention. Instead of flexible materials, the upper and lower laminae may be fabricated of glass or stiff plastic material having a relatively high refractive index and joined by a transparent adhesive with a relatively low index as previously explained.

Sheets in accordance with this invention have the major advantage of being flat on both sides. The reverse side may be rendered reflecting at the factory as an article of commerce if desired. Three dimensional effects can be obtained by printing a reflecting design on the back surface and an indicia on the front face as well.

The reflector sheet material with a reflecting layer underneath can be cut into strips and cemented to highways as center striping, and may be used as a marking for abutments and the like.

It will be obvious to those skilled in the art that various changes may be made without departing from the spirit of the invention and therefore the invention is not limited to what is shown in the drawings and described in the specification but only as indicated in the appended claims.

What is claimed is:

1. A flexible weatherproof reflex light reflector sheet adapted to be supplied in roll form for use in making signs and indicia for outdoor use, comprising a flexible water resistant light transmitting outer lamina, a flexible water resistant light transmitting lower lamina, a light transmitting adhesive cementing the two laminae together and completely filling the space between the laminae, said outer and lower laminae having an index of refraction substantially higher than the index of refraction of said adhesive material, the adjacent surfaces of said laminae having a plurality of outwardly projecting rounded projections projecting therefrom, said projections being arranged in an all-over pattern covering the laminae with the adjacent projections on the two laminae being in alignment, the faces of said adjacent aligned projections in the two laminae being separated not more than 0.4 times the radius of the rounded projections, whereby the lower surface of said lower lamina may be brought into contact with a reflecting base surface to produce reflexive reflection of incident light.

2. A sheet in accordance with claim 1 wherein said projections are in the shape of semi-spheres.

3. A sheet in accordance with claim 1 wherein said adjacent aligned projections in the two laminae are in approximately face to face contact.

4. A sheet in accordance with claim 1 wherein the ratio of the index of refraction of said adhesive material to the index of refraction of said laminae is approximately .7–.9.

5. A sheet in accordance with claim 1 wherein the center of curvatures of the projections on the lower lamina are spaced a distance from the outer flat surface of the sheet whereby the reflecting surface to which the sheet is attached is located within the region of condensation of light by said projections.

6. A sign or marker adapted for outdoor exposure comprising a relatively rigid base with at least a portion of the surface thereof being light reflecting, a flexible weatherproof light reflex reflector sheet adhesively united to said base and comprised of a water resistant light transmitting outer lamina, a water resistant light transmitting lower lamina, a light transmitting adhesive cementing the two laminae together and completely filling the space between the laminae, said outer and lower laminae having an index of refraction substantially higher than the index of refraction of said adhesive material, the surfaces of said laminae adjacent said adhesive having a plurality of outwardly projecting rounded projections, said projections being arranged in an all-over pattern with the adjacent projections on the two laminae being in alignment, the faces of said adjacent aligned projections in the two laminae being separated not more than 0.4 times the radius of the rounded projections, the combination of said sheet and said base producing a reflexive reflection of incident light.

7. A sign in accordance with claim 6 wherein said projections on each sheet are in the shape of aligned semispheres in approximately face-to-face contact.

8. A sign in accordance with claim 6 wherein the ratio of the index of refraction of said adhesive material to the index of refraction of said laminae is approximately .7–.9.

9. A sign in accordance with claim 6 wherein the center of curvatures of the projections on the lower lamina are spaced a distance from the outer flat surface of the sheet whereby the reflecting surface to which the sheet is attached is located within the region of condensation of light by said projections.

References Cited by the Examiner

UNITED STATES PATENTS

| | | | |
|---|---|---|---|
| 982,772 | 1/11 | Wadsworth | 88—60 |
| 1,610,581 | 12/26 | O'Shaughnessy. | |
| 2,009,769 | 7/35 | Gage | 88—82 |
| 2,292,715 | 8/42 | Peden | 88—82 |
| 2,330,194 | 9/43 | Blau | 88—82 |
| 2,498,489 | 2/50 | Haggart | 18—59 |
| 2,555,191 | 5/51 | Haggart | 88—82 |
| 2,568,126 | 9/51 | Keeley | 154—123 |
| 2,713,286 | 7/55 | Taylor | 88—82 |

FOREIGN PATENTS 456,398    11/36    Great Britain.

JEWELL H. PEDERSEN, *Primary Examiner.*

FREDRICK M. STRADER, EMIL G. ANDERSON,
*Examiners.*